No. 684,811. Patented Oct. 22, 1901.
D. F. GROVE.
SPECTACLE FRAME HOLDER FOR SOLDERING.
(Application filed Sept. 27, 1898.)
(No Model.)
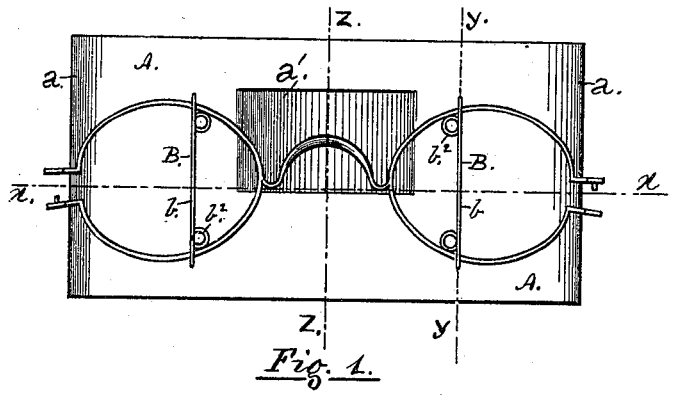
Fig. 1.
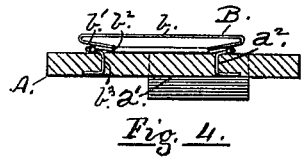
Fig. 2.
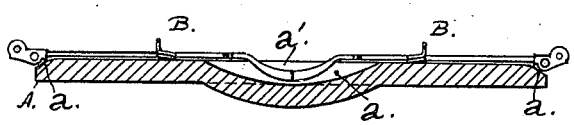
Fig. 3.
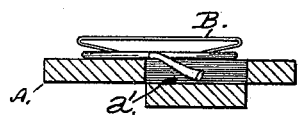
Fig. 4.
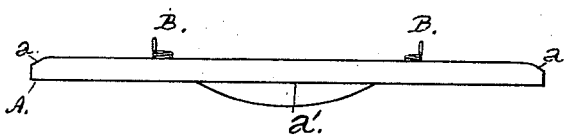
Fig. 6.
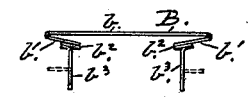
Fig. 5.
Fig. 8.
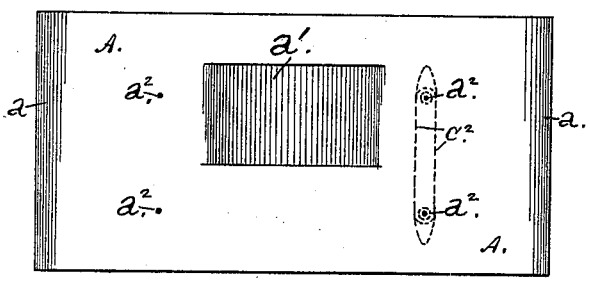
Fig. 7.
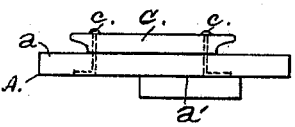
Fig. 9.
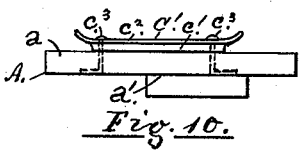
Fig. 10.
Witnesses:
Inventor:
Dade F. Grove.
By Daniel H. Herr,
Attorney.

UNITED STATES PATENT OFFICE.

DADE FISHER GROVE, OF LANCASTER, PENNSYLVANIA.

SPECTACLE-FRAME HOLDER FOR SOLDERING.

SPECIFICATION forming part of Letters Patent No. 684,811, dated October 22, 1901.

Application filed September 27, 1898. Serial No. 691,996. (No model.)

*To all whom it may concern:*

Be it known that I, DADE FISHER GROVE, a citizen of the United States, residing at Lancaster, in the county of Lancaster and State of Pennsylvania, have invented certain new and useful Improvements in Spectacle-Frame Holders for Soldering; and I do hereby declare the following to be a full, clear, and exact description of the invention, such as will enable others skilled in the art to which it appertains to make and use the same.

This invention relates to improvements in a spectacle-frame holder of that class in which a base portion or block is provided on its upper face with suitable means for holding parts of spectacle-frames in proper position for joining or soldering said parts together.

The object of the invention is the production of a device simple in construction whereby broken spectacle-frames may be conveniently mended or nose-bridges secured to their respective eyepieces, as by soldering or brazing, and in which provision is made to prevent the escape of heat as much as possible from the soldering or brazing point.

The invention consists of the parts and their arrangement, as will at large appear in the following description and be pointed out in the appended claim.

The purposes of the invention are attained by the means and devices illustrated in the accompanying drawings, similar reference-letters designating like parts throughout the several views, in which—

Figure 1 is a plan of a spectacle-frame holder embodying the elements of the invention with a broken frame in position thereon, the break being through the center of the nose-bridge; Fig. 2, an elevation from the right of Fig. 1; Fig. 3, a sectional elevation from below of the portion lying above the line $x\ x$ in Fig. 1; Fig. 4, a sectional elevation from the right of the portion lying to the left of the line $y\ y$ in Fig. 1; Fig. 5, a similar elevation of the portion lying to the left of the line $z\ z$ in Fig. 1; Fig. 6, an elevation from below of Fig. 1 with the spectacle-frame removed; Fig. 7, a top view of Fig. 6 with the holding-bars removed; Fig. 8, a side elevation of a holding-bar as it appears before attachment to the base with dotted lines showing the pins bent over, securing it to said base; and Figs. 9 and 10 are right end elevations of the base with modifications of the holding-bar in position on its upper face.

Now for the purposes of the invention the base A, of approved size and shape, is made of any non-conducting material, of which asbestos in the form of sheet-packing is preferred because of its ability to withstand heat or flame, being practicably indestructible in the latter. In the drawings the base is shown to be oblong and rectangular in plan with its upper end edges $a\ a$ downwardly rounded or beveled, and through its upper face, at a prescribed point thereof, said base is provided with a downwardly-curving recess or hollow depression $a'$, of approved size and depth, adapted to receive the nose-bridge and in which the soldering or brazing is done, while on each side of said recess, quadrangularly arranged and prescribed distances apart, are formed orifices or holes $a^2$, through which the frame-holding bars B, yet to be described, are secured in place.

It will here be observed that through the holes $a^2$ any suitable pins, nails, or other projections (not shown) may be secured to the base A to hold articles to be mended or operated upon in place; that holding-bars, in form of a cleat C, Fig. 9, may be secured to the base in question by nails or pins $c$, as shown by full and dotted lines in the same figure; also, that the holding-bar or cleat may be made as illustrated and indicated by $C'$ in Fig. 10, where a strip $c'$ is first placed on said base, and on top of said strip is laid a strap $c^2$, preferably of spring metal, all being held together and secured in position by nails or pins $c^3$, as shown by full and dotted lines in this figure, both constructions, Figs. 9 and 10, having the appearance in plan indicated by dotted lines $C^2$ in Fig. 7. It is, however, preferred to make the holding-bar or cleat B, Fig. 8 showing a side elevation thereof, from a continuous piece of properly-tempered wire in order that it may have the following instrumentalities, enabling it to perform in a satisfactory manner certain separate and distinct functions. To this end it comprises a horizontal bar $b$, having a prescribed length, with its ends turned downwardly under the desired distance, forming inwardly approaching and sloping return-folds $b'\ b'$, thence continued into the required number of spiral coils $b^2\ b^2$, with their lower ends merging into downwardly-projecting perpendicular pins $b^3\ b^3$ of requisite length, said pins and folds being arranged in the vertical plane of said bar $b$.

To complete the holder of the invention, two of the bars B are applied to the base A, arranged on its upper face (best shown in Figs. 1 and 6) and secured to the body thereof in having the pins $b^3$ pass through the orifices $a^2$, with their lower ends bent over and pressed into its under face. (Best shown in Fig. 4.) It will here be seen in this application of the bars B to the base A that the coils $b^2$ of the former will rest closely against the upper face of the latter, and when a spectacle-frame is placed in position thereon, as shown in Figs. 1 to 5, that the coils will form abutments engaging the inner edge of the eyepieces, the resiliency thereof permitting said engagement and keeping them in position; that the slope $b'$ engaging the top edges of said eyepieces will keep them downwardly in place; that the resiliency of said slopes, together with that of the coils, will allow eyepieces of different thicknesses to be placed thereon; that when a broken spectacle-frame, the break being in the nose-bridge, has its eyepieces placed in position, as shown, or when an entire bridge is to have its ends secured to said eyepieces, said several parts, by reason of said engagement, will be held firmly in position for soldering or brazing; that the nose-bridge being within the depression $a'$ and the material of which the base A is made being non-conducting the heat of blasts, as much as possible, will be confined to the soldering or brazing point, and the device is a simple and effective holder, whereby soldering and brazing in spectacle-frames can be conveniently done.

Having now described and ascertained the invention and set forth or shown the manner in which its functions are performed, what is considered new, and desired to be secured by Letters Patent, is—

The combination in a spectacle-frame holder with a non-conducting base with a depression in the upper face thereof, of an eyepiece-holding cleat on each side of said depression and secured to the body of said base, said cleat made in one piece of tempered wire having a horizontal bar $b$ with a downwardly and inwardly sloping return-fold at each end thereof; a spiral coil at the lower end of each of said folds, and a downwardly-projecting pin from the lower end of each of said coils; said pins passing through the body of the base with their lower ends folded over and pressed into its under face; all substantially as described and for the purpose hereinbefore set forth.

In testimony whereof I affix my signature in presence of two witnesses.

DADE FISHER GROVE.

Witnesses:
HARVEY B. LUTZ,
PAUL A. HERR.